US009338316B2

(12) United States Patent
    Nakayama

(10) Patent No.: US 9,338,316 B2
(45) Date of Patent: May 10, 2016

(54) IMAGE READING APPARATUS

(71) Applicant: Daisuke Nakayama, Nagoya (JP)

(72) Inventor: Daisuke Nakayama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/210,563

(22) Filed: Mar. 14, 2014

(65) Prior Publication Data

US 2014/0293374 A1   Oct. 2, 2014

(30) Foreign Application Priority Data

Mar. 29, 2013   (JP) ................................. 2013-070762

(51) Int. Cl.
    *H04N 1/04*     (2006.01)
    *H04N 1/00*     (2006.01)
(52) U.S. Cl.
    CPC ......... *H04N 1/00588* (2013.01); *H04N 1/0057* (2013.01); *H04N 1/00602* (2013.01); *H04N 1/00615* (2013.01); *H04N 2201/02497* (2013.01)
(58) Field of Classification Search
    CPC . H04N 1/193; H04N 1/00602; H04N 1/0057; H04N 1/00588; H04N 1/121
    USPC .......... 358/496, 498, 408, 488, 486; 399/364, 399/367, 374; 355/23, 24
    See application file for complete search history.

(56) References Cited

U.S. PATENT DOCUMENTS

| | | | | |
|---|---|---|---|---|
| 5,513,017 A * | 4/1996 | Knodt et al. | .................. | 358/471 |
| 5,661,571 A * | 8/1997 | Ijuin et al. | ..................... | 358/471 |
| 5,680,651 A * | 10/1997 | Tsuji et al. | ..................... | 399/401 |
| 5,710,634 A | 1/1998 | Kuriyama et al. | | |
| 5,751,446 A | 5/1998 | Fujioka | | |
| 6,088,135 A * | 7/2000 | Kusumoto | .................... | 358/498 |
| 6,178,017 B1 | 1/2001 | Ishida | | |
| 6,665,098 B1 * | 12/2003 | Nagarajan | .................... | 358/474 |
| 7,561,313 B2 | 7/2009 | Endo | | |
| 7,872,783 B2 | 1/2011 | Kitagawa et al. | | |
| 7,913,994 B2 * | 3/2011 | Morikawa et al. | ............ | 271/124 |
| 7,954,803 B2 | 6/2011 | Kitagawa et al. | | |
| 8,210,515 B2 | 7/2012 | Nishizawa et al. | | |

(Continued)

FOREIGN PATENT DOCUMENTS

| | | |
|---|---|---|
| JP | H09-284478 A | 10/1997 |
| JP | 2005-051313 A | 2/2005 |

(Continued)

OTHER PUBLICATIONS

Apr. 16, 2014—(US) Non-Final Office Action—U.S. Appl. No. 14/040,457.

(Continued)

*Primary Examiner* — Cheukfan Lee
(74) *Attorney, Agent, or Firm* — Banner & Witcoff, Ltd.

(57) ABSTRACT

An image reading apparatus includes a conveyor. The conveyor includes a first roller, a second roller, and a contact portion. The first roller is configured to rotate on a first axis. One of the second roller and the contact portion is disposed on an upstream side of the first axis along a conveyance path, and the other of the second roller and the contact portion is disposed on a downstream side of the first axis along the conveyance path. A first distance between a surface of the first roller and a surface of the second roller and a second distance between a surface of the first roller and a surface of the contact portion is fixed.

6 Claims, 14 Drawing Sheets

(56) References Cited

U.S. PATENT DOCUMENTS

| | | | |
|---|---|---|---|
| 8,333,377 B2* | 12/2012 | Kohyama | 271/279 |
| 8,371,573 B2* | 2/2013 | Morikawa et al. | 271/121 |
| 8,608,152 B2 | 12/2013 | Takahata | |
| 8,675,264 B2* | 3/2014 | Olsen | 358/474 |
| 8,705,150 B2* | 4/2014 | Shirai et al. | 358/498 |
| 8,717,636 B2 | 5/2014 | Lee et al. | |
| 2002/0176115 A1 | 11/2002 | Yamamoto | |
| 2003/0197770 A1* | 10/2003 | Klinefelter et al. | 347/104 |
| 2005/0057785 A1 | 3/2005 | Endo | |
| 2008/0259414 A1 | 10/2008 | Kitagawa et al. | |
| 2008/0285097 A1 | 11/2008 | Kitagawa et al. | |
| 2009/0189337 A1* | 7/2009 | Yamamoto | 271/189 |
| 2011/0101602 A1* | 5/2011 | Kohyama | 271/225 |
| 2012/0105925 A1 | 5/2012 | Shirai et al. | |
| 2013/0170001 A1 | 7/2013 | Takahata et al. | |
| 2014/0103598 A1* | 4/2014 | Kuriki | 271/3.19 |
| 2014/0138902 A1 | 5/2014 | Takahata et al. | |
| 2014/0239583 A1 | 8/2014 | Kawashima | |
| 2014/0293375 A1* | 10/2014 | Mukai | 358/498 |
| 2014/0300939 A1* | 10/2014 | Suzuki | 358/498 |

FOREIGN PATENT DOCUMENTS

| | | |
|---|---|---|
| JP | 2008-270954 A | 11/2008 |
| JP | 2008-285259 A | 11/2008 |
| JP | 2011-066676 A | 3/2011 |
| JP | 2012-015677 A | 1/2012 |
| JP | 2012-034186 A | 2/2012 |
| JP | 2012-065064 A | 3/2012 |
| JP | 2012-100115 A | 5/2012 |
| JP | 2012-171788 A | 9/2012 |
| JP | 2012-171789 A | 9/2012 |
| JP | 2012-184057 A | 9/2012 |
| JP | 2012-216930 A | 11/2012 |
| JP | 2012-216931 A | 11/2012 |

OTHER PUBLICATIONS

Machine translation of JP 9-284478, retrieved Apr. 5, 2012.
Aug. 7, 2014—(US) Notice of Allowance—U.S. Appl. No. 14/040,457.
Aug. 29, 2014—(US) Co-pending U.S. Appl. No. 14/472,582.
Feb. 23, 2015—(US) Notice of Allowance—U.S. Appl. No. 14/472,582.
Jul. 6, 2015—(EP) Office Action—App 14182809.5.
Aug. 25, 2015—(JP) Office Action—APP 2013-070762—partial Eng Tran.

* cited by examiner

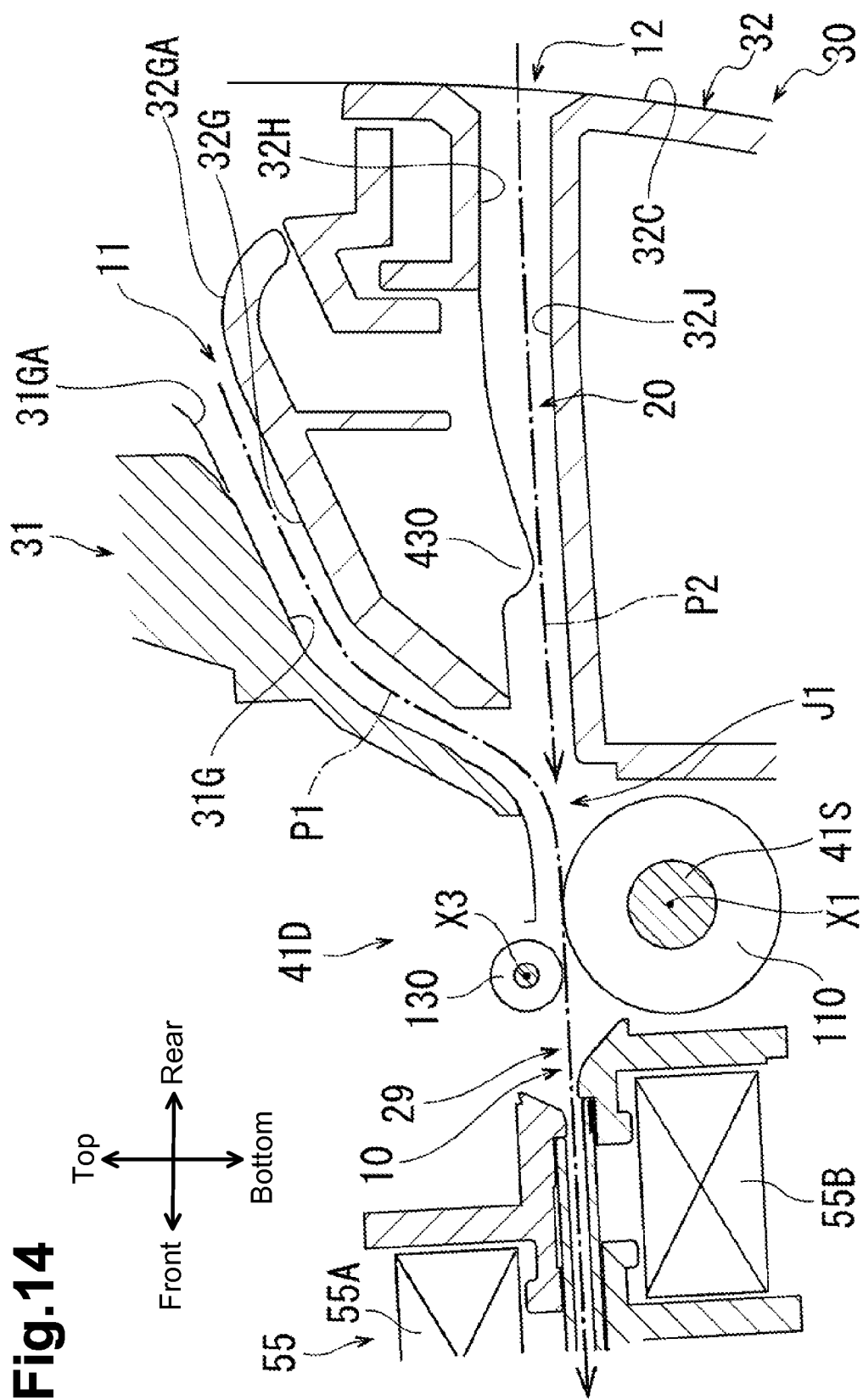

IMAGE READING APPARATUS

CROSS-REFERENCE TO RELATED APPLICATION

This application claims priority from Japanese Patent Application No. 2013-070762 filed on Mar. 29, 2013, the content of which is incorporated herein by reference in its entirety.

TECHNICAL FIELD

The disclosure relates to an image reading apparatus and a medium conveyance apparatus.

BACKGROUND

A known image reading apparatus includes a housing, a conveyor, and a reader. The housing includes a conveyance guide portion. The conveyance guide portion has a conveyance path through which a first medium and a second medium are guided. The second medium has a width smaller than that of the first medium and a thickness greater than that of the first medium. The conveyor is configured to convey the first medium and the second medium along the conveyance guide portion. The reader is configured to read an image on the first medium and the second medium that are conveyed along the conveyance guide portion. The second medium is guided in a conveyance region disposed at an end portion of the conveyance guide portion in a width direction.

The conveyor includes a first roller and a second roller configured to convey the second medium in the conveyance region in cooperation with each other. The first roller is configured to rotate on a first axis extending parallel to the width direction and to contact a first surface of the second medium. The second roller is rotatably disposed on a second axis parallel to the first axis and opposite to the first axis across the conveyance path. The second axis is separated apart from the first axis by the distance greater than the sum of the radii of the first roller and the second roller. The second roller is urged by an urging spring toward the first roller, so that distance between the first axis and the second axis may change. The second roller is configured to contact a second surface of the second medium opposite to the first surface. The second roller is placed at the same position as the first axis of the first roller in a conveyance direction of the second medium.

In the image reading apparatus, the distance between the first roller and the second roller approaching closest to the first roller is set greater than the thickness of the first medium. Therefore, in the image reading apparatus, application of conveyance force from the first roller configured to rotate, to the first medium conveyed along the conveyance guide portion is reduced.

In the image reading apparatus, the first roller is rotated while contacting the first surface of the second medium conveyed along the conveyance guide portion and the second roller urged by the urging spring is rotated following the first roller while contacting the second surface of the second medium. Thus, the conveyance force is applied from the first roller to the second medium. Consequently, the second medium is favorably conveyed in the image reading apparatus.

SUMMARY

The second roller configured to be urged toward the first roller is employed in the image reading apparatus. Therefore, an urging spring configured to urge the second roller and a guide member configured to make the second roller contact the second medium are required, so that reduction in the manufacturing costs of the image reading apparatus may be difficult.

The disclosure relates to an image reading apparatus that may be configured to favorably convey a second medium while skew of a first medium is prevented or reduced and may realize reduction in the manufacturing costs of the image reading apparatus, and to a medium conveyance apparatus.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the disclosure, needs satisfied thereby, and the objects, features, and advantages thereof, reference now is made to the following descriptions taken in connection with the accompanying drawing.

FIG. 14 is a partially sectional view of an image reading apparatus in a fourth example embodiment.

DETAILED DESCRIPTION OF EMBODIMENTS

Figure 1:
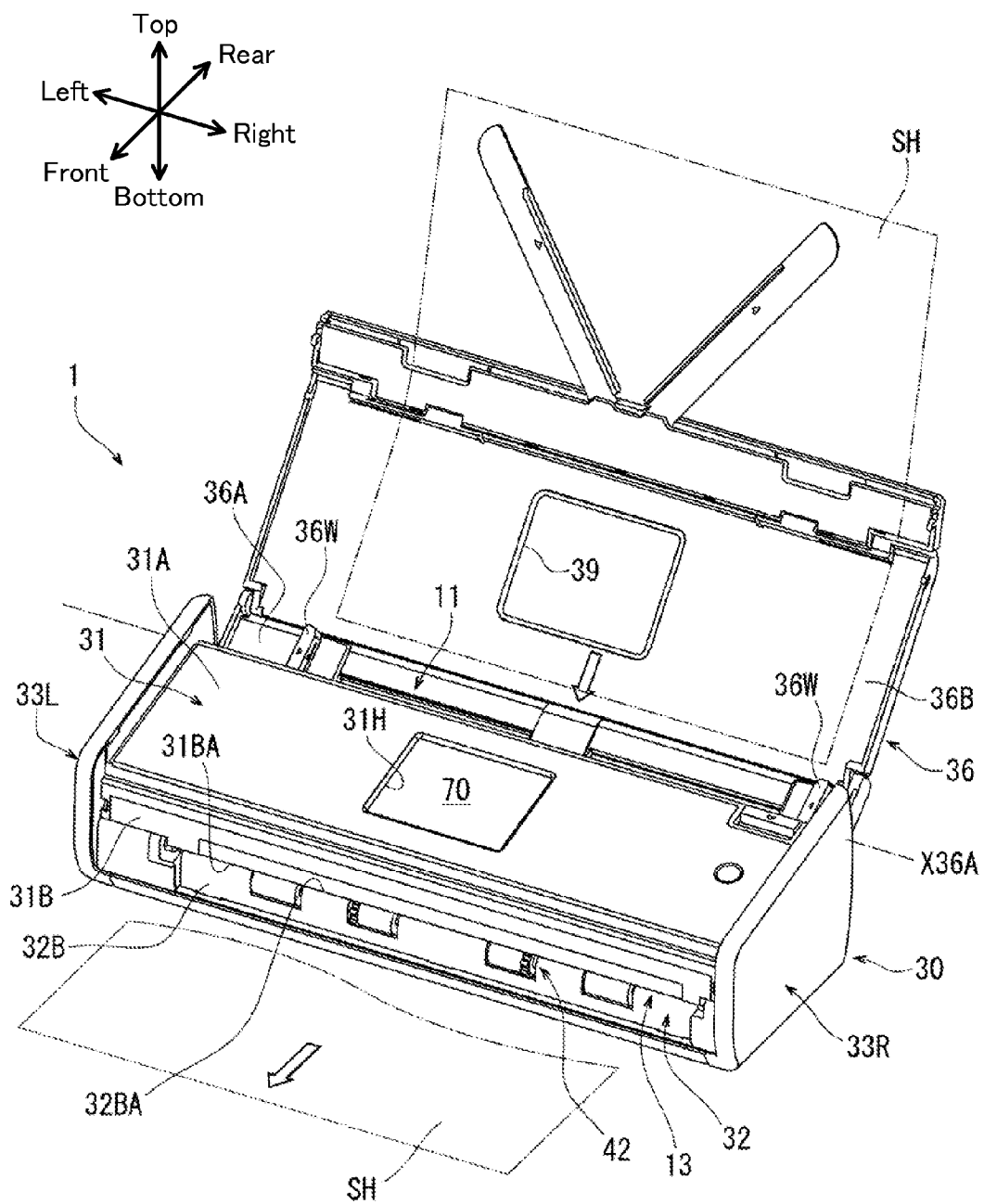
FIG. 1 is a front perspective view of an image reading apparatus, in a first example embodiment according to one or more aspects of the disclosure, in which a sheet tray is open.

An example embodiment is described in detail herein with reference to the accompanying drawings, like reference numerals being used for like corresponding parts in the various drawings.

An image reading apparatus 1, as depicted in FIG. 1, may be an example of an image reading apparatus and a medium conveyance apparatus. In FIG. 1, a side of the image reading apparatus 1 on which a discharge opening 13 is disposed may be defined as the front side of the image reading apparatus 1. A side of the image reading apparatus 1 that is placed on the left when viewed from the side facing the discharge opening 13 may be defined as the left side of the image reading apparatus 1. To facilitate understanding of the orientation and relationship of the various elements disclosed herein, the front, rear, left, right, top, and bottom of the image reading apparatus 1 may be determined with reference to axes of the three-dimensional Cartesian coordinate system included in each of the relevant drawings.

As depicted in FIGS. 1-8, the image reading apparatus 1 may comprise a housing 30 and a sheet tray 36. The housing 30 may comprise a first chute member 31, a second chute member 32, and a pair of left and right side frames 33L and 33R that may be combined. More specifically, the left and right side frames 33L and 33R may be disposed with a space therebetween in the left and right direction. The upper end of each of the left and right side frames 33L and 33R may be connected to each of the left and right ends of the first chute member 31, respectively. The lower end of each of the left and right side frames 33L and 33R may be connected to each of the left and right ends of the second chute member 32, respectively.

The first chute member 31 disposed on the upper side and the second chute member 32 disposed on the lower side may oppose in a vertical direction, e.g., a top-bottom direction, with a distance therebetween. The first chute member 31 and the second chute member 32 may be interposed between the left and right side frames 33L and 33R.

Figure 5:
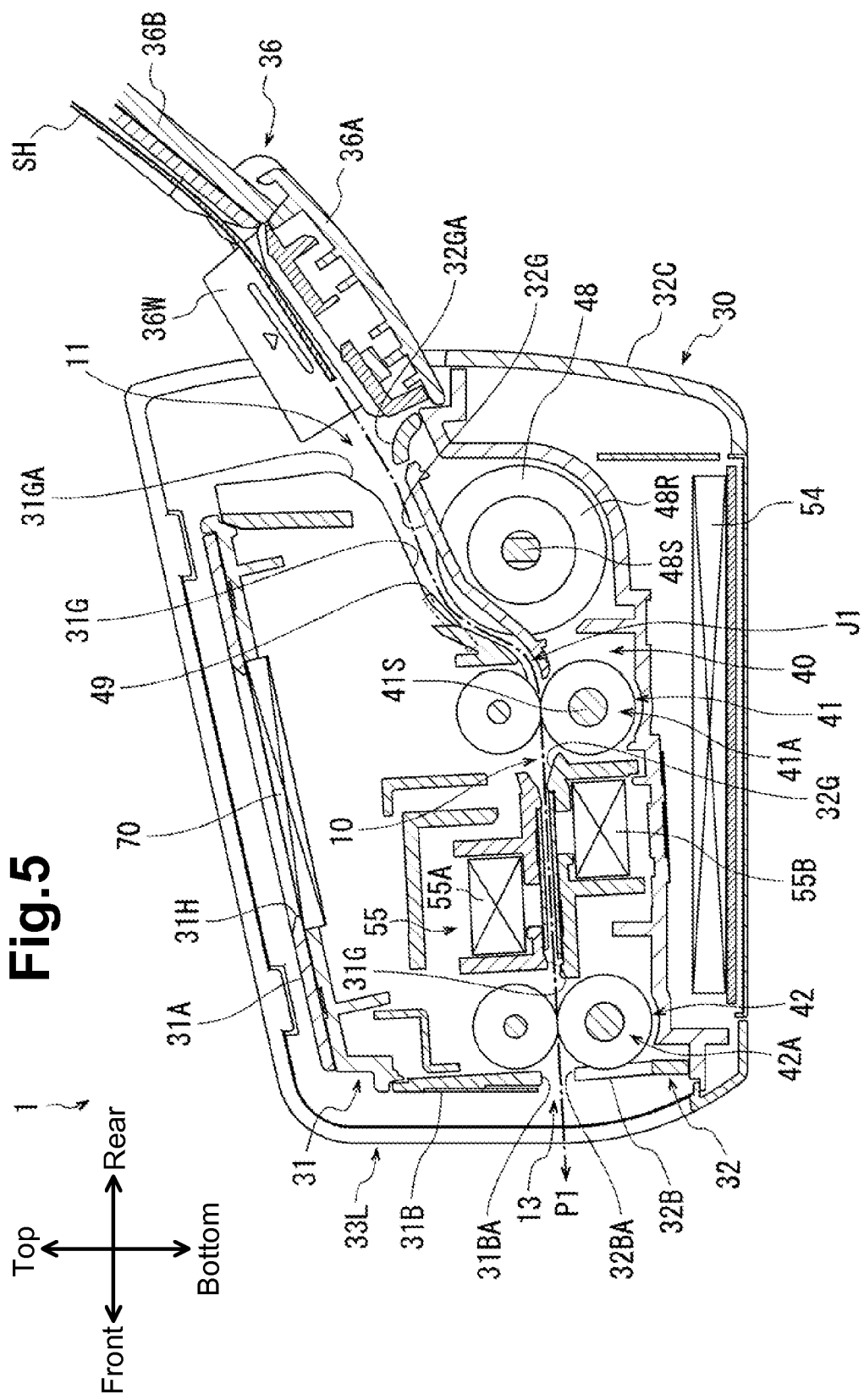
FIG. 5 is a sectional view of the image reading apparatus, taken along the line A-A in FIG. 4.
Figure 6:
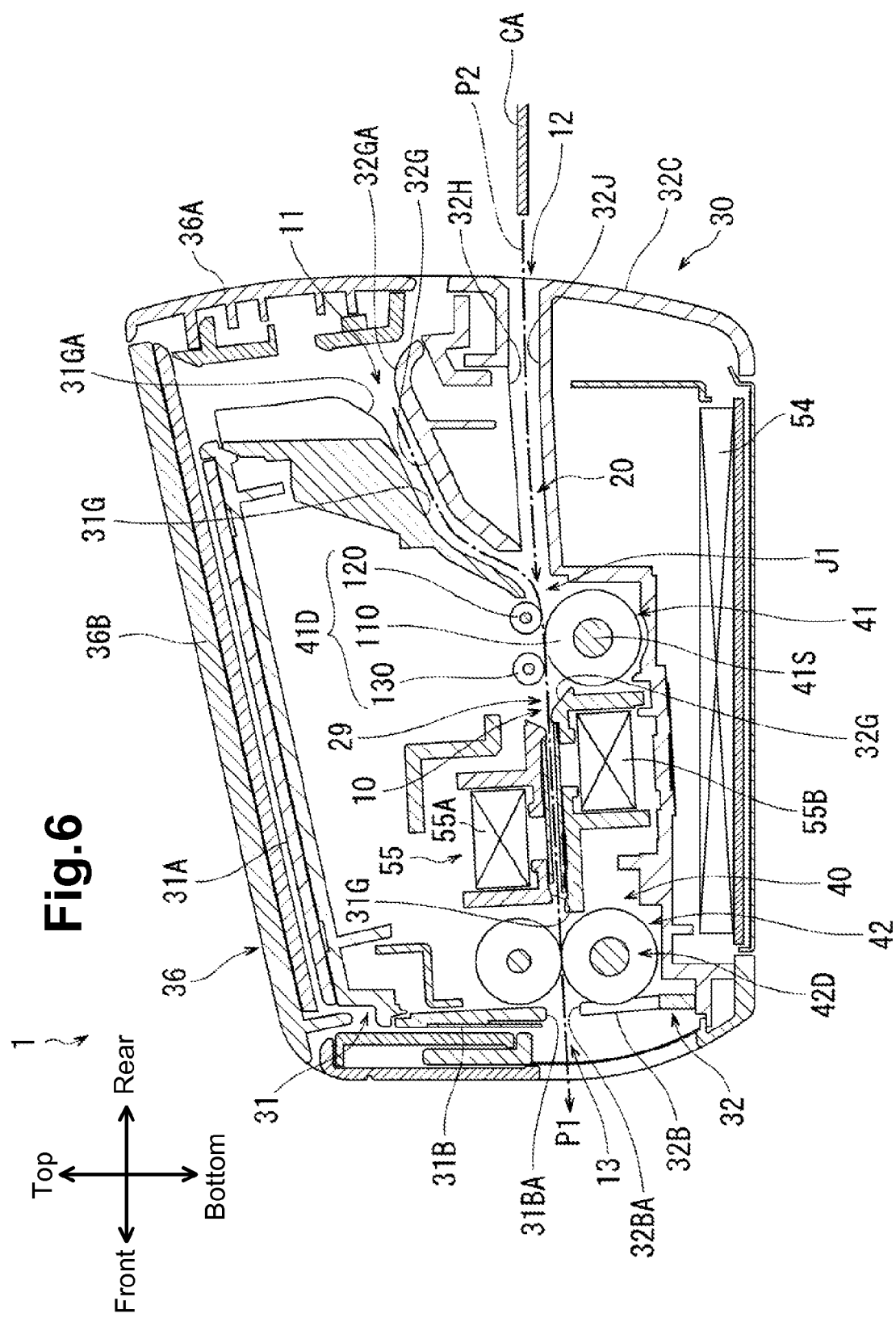
FIG. 6 is a sectional view of the image reading apparatus, taken along the line B-B in FIG. 4.
Figure 7:
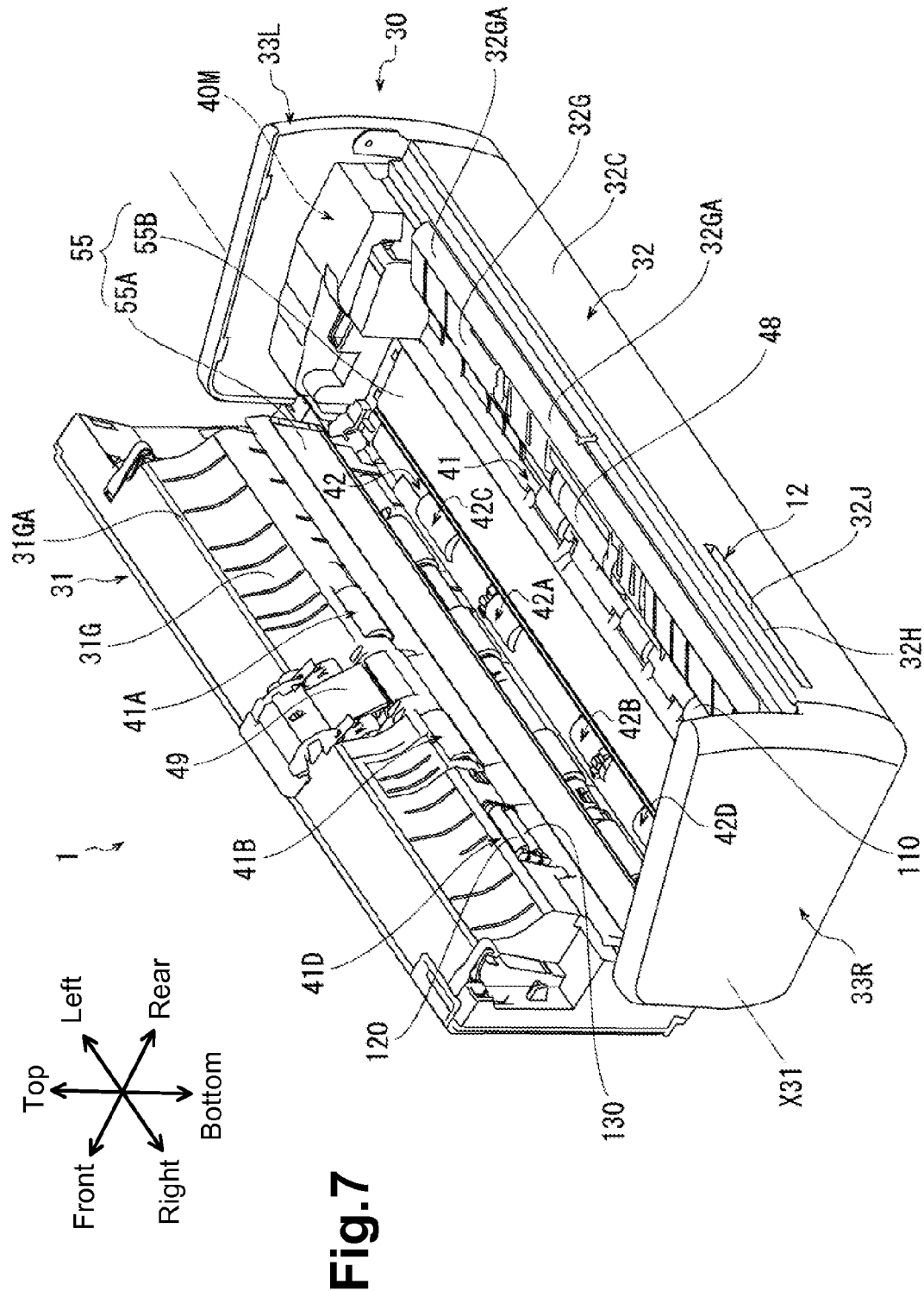
FIG. 7 is a perspective view of the image reading apparatus in which a first chute member is pivotally moved.

As depicted in FIGS. 1 and 5-7, the first chute member 31 may comprise an upper surface 31A, a front surface 31B, and an upper guide surface 31G. The upper surface 31A may comprise a flat surface facing upward. The upper surface 31A may slantingly extend forwardly and downwardly from its rear side. A touch panel 70 may be disposed at a central portion of the upper surface 31A. The front surface 31B may comprise a flat surface facing forward. The front surface 31B may extend vertically downward from the front end of the upper surface 31A to a lower end 31BA. As depicted in FIGS. 5-7, the upper guide surface 31G may comprise a curved surface that may be disposed on a rear portion thereof and a flat surface that may be disposed on a front portion thereof. The curved surface, e.g., an inclined portion, of the upper guide surface 31G may slantingly extend forwardly and downwardly from a rear end 31GA thereof, e.g., the rear end of the lower side of the upper surface 31A. The flat surface, e.g., a horizontal portion, of the upper guide surface 31G may extend forwardly from a central portion of the first chute member 31 in the front-rear direction to the lower end 31BA of the front surface 31B. In other words, the first chute member 31 may slantingly extend forwardly and downwardly from its rear side.

As depicted in FIGS. 1, 2 and FIGS. 5-7, the second chute member 32 may comprise a front surface 32B, a lower guide surface 32G and a rear surface 32C. The front surface 32B may comprise a flat surface facing forward. The front surface 32B may comprise an upper end 32BA. The upper end 32BA may be positioned below the lower end 31BA of the front surface 31B with a distance therebetween. The front surface 32B may extend vertically downward from the upper end 32BA. As depicted in FIGS. 5-7, the lower guide surface 32G may comprise a curved surface that may be disposed on a rear portion thereof and a flat surface that may be disposed on a front portion thereof. The curved surface, e.g., an inclined portion, of the lower guide surface 32G may slantingly extend forward and downward from a rear end 32GA thereof, e.g., the upper end of the rear surface 32C, along the inclined portion of the upper guide surface 31G. The flat surface, e.g., a horizontal portion, of the lower guide surface 32G may extend forward from a central portion of the second chute member 32 in the front-rear direction to the upper end 32BA of the front surface 32B. The rear surface 32C may comprise a flat surface facing rearward. The rear surface 32C may extend downward from its upper end in a generally vertical direction.

Figure 8:
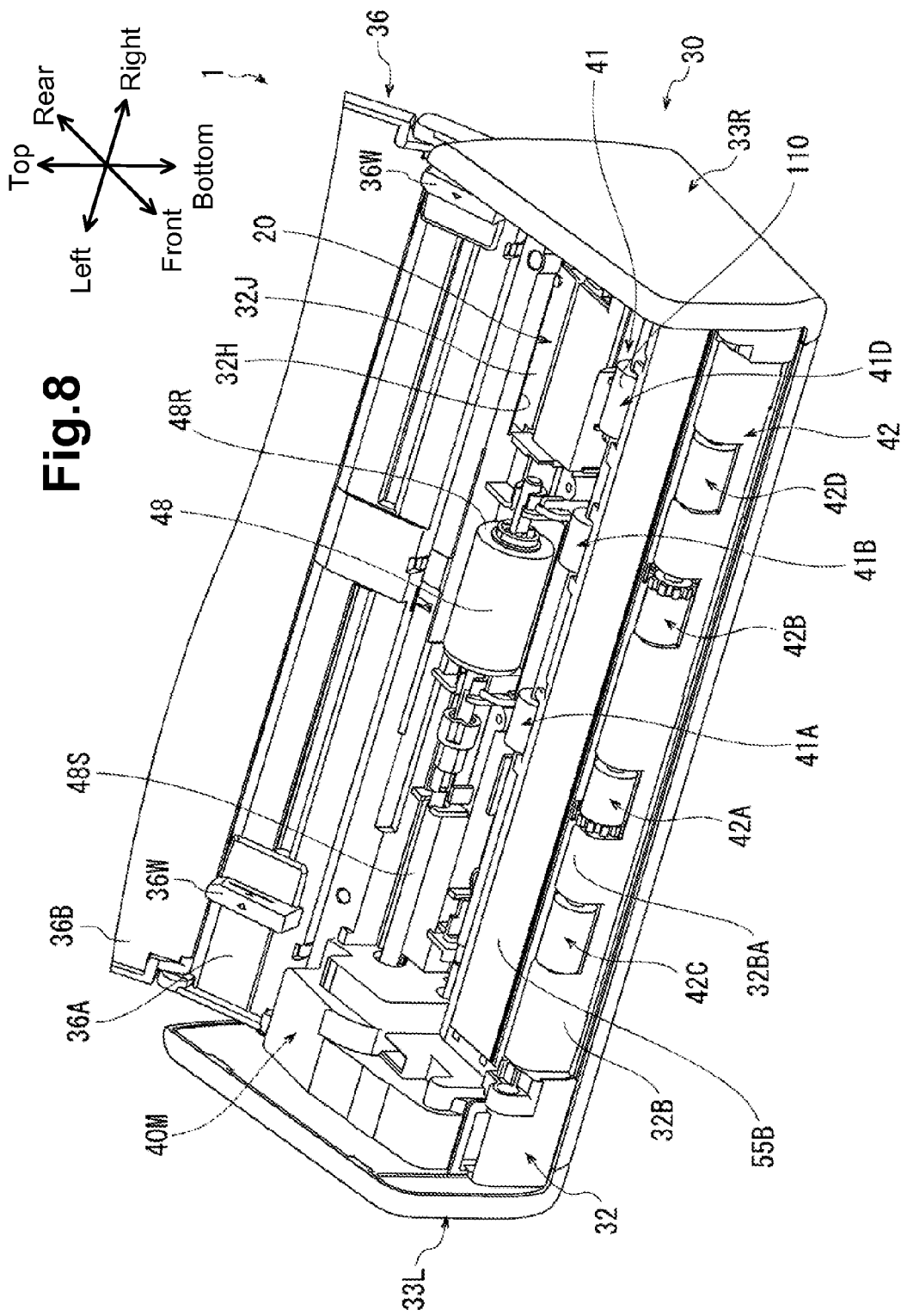
FIG. 8 is a perspective view of the image reading apparatus showing a separation roller and a drive shaft.

As depicted in FIGS. 6 and 8, the second chute member 32 may comprise a lower card guide surface 32J and an upper card guide surface 32H. The lower card guide surface 32J may extend horizontally rearward to the rear surface 32C from a right end in FIG. 6, i.e., the rear end, of the horizontal portion of the lower guide surface 32G. The upper card guide surface 32H may be positioned above the lower card guide surface 32J with a distance therebetween. The upper card guide surface 32H may extend horizontally rearward from the right end in FIG. 6, i.e., the rear end, of the horizontal portion of the upper guide surface 31G to the rear surface 32C in parallel with the lower card guide surface 32J. As depicted in FIG. 6, the height or level of the upper card guide surface 32H in the vertical direction may be almost the same as the height or level of the horizontal portion of the upper guide surface 31G in the vertical direction.

The upper guide surface 31G, the lower guide surface 32G, the upper card guide surface 32H, and the lower card guide surface 32J might not be limited to a smooth continuous surface, but may be constituted by, for example, tips of ribs or protrusions.

Figure 4:
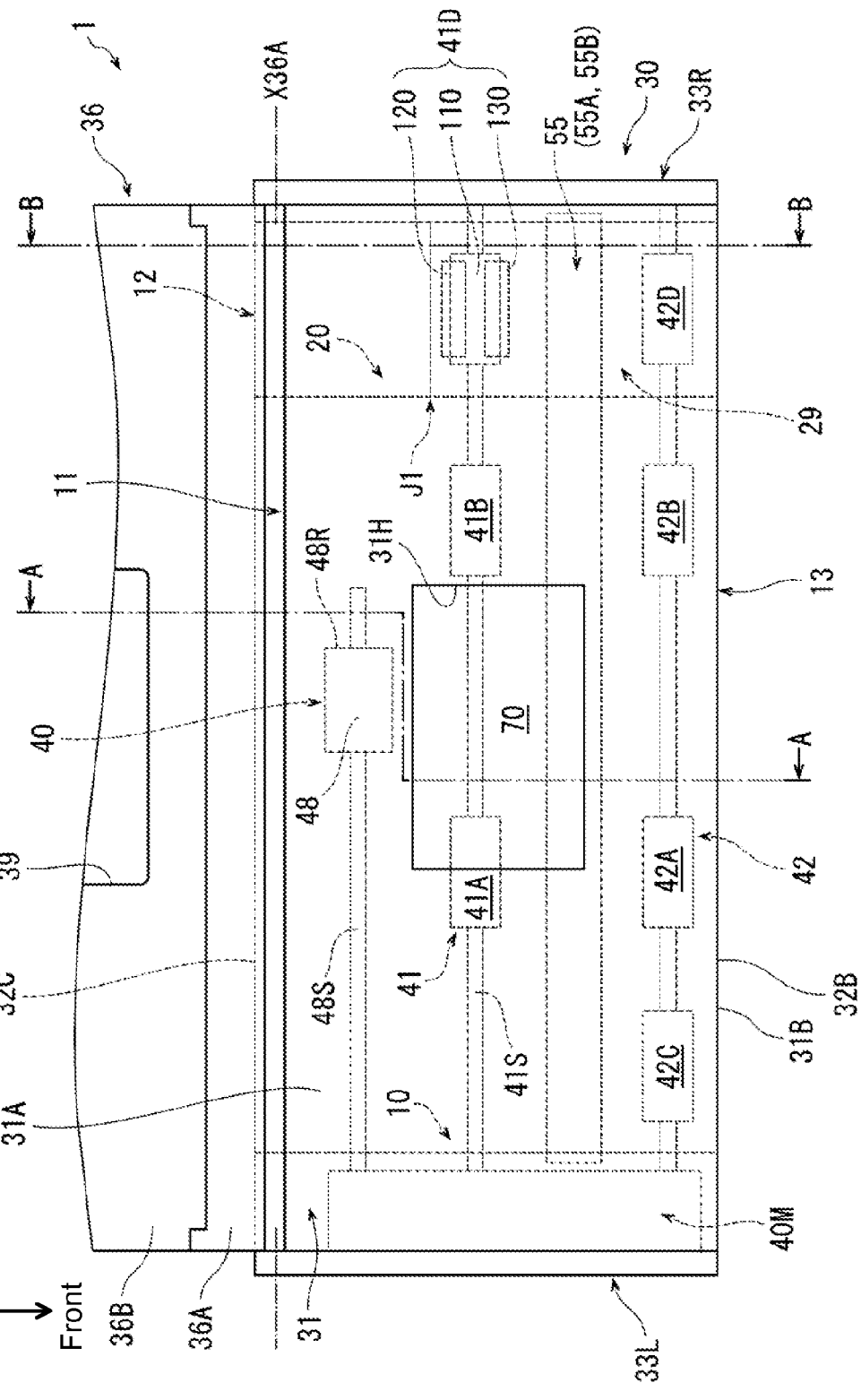
FIG. 4 is a diagrammatic top view of the image reading apparatus in which the sheet tray is open.

As depicted in FIGS. 4 and 6, a junction J1 may be disposed at a position where the lower card guide surface 32J may continue to the right end in FIG. 6, i.e., the rear end, of the horizontal portion of the lower guide surface 32G.

As depicted in FIGS. 1 and 5, the housing 30 may have a first introduction opening 11 and a discharge opening 13.

One or more sheets SH may be inserted into the first introduction opening 11. The sheet SH may comprise, for example, a sheet of paper or an overhead projector (OHP) sheet. The sheet SH may be an example of a first medium.

More specifically, as depicted in FIG. 5, the first introduction opening 11 may be disposed between the first chute member 31 and the second chute member 32. The first introduction opening 11 may be may be provided at a space between the rear edge 31GA of the upper guide surface 31G and the rear edge 32GA of the lower guide surface 32G. As depicted in FIG. 1, the first introduction opening 11 may extend in the left-right direction from a portion near the left side frame 33L to a portion near the right side frame 33R. The length of the first introduction opening 11 in the left-right direction may be greater than the width of the sheet SH.

As depicted in FIGS. 1 and 5, the sheet SH may be discharged from the discharge opening 13. The discharge opening 13 may be disposed between the first chute member 31 and the second chute member 32. More specifically, the discharge opening 13 may be provided at a space between the lower end 31BA of the front surface 31B and the upper end 32BA of the front surface 32B. The discharge opening 13 may extend in the left-right direction from a portion near the left side frame 33L to a portion near the right side frame 33R. The length of the discharge opening 13 in the left-right direction may be greater than the width of the sheet SH, similar to the first introduction opening 11.

As depicted in FIGS. 4-6, the image reading apparatus 1 may comprise a conveyance guide portion 10. The conveyance guide portion 10 may comprise the first chute member 31 and the second chute member 32. The conveyance guide portion 10 may comprise a first conveyance path P1 that may be defined between the upper guide surface 31G of the first chute member 31 and the lower guide surface 32G of the second chute member 32 in the vertical direction. The conveyance guide portion 10 may be configured to guide the sheet SH from the first introduction opening 11 to the discharge opening 13 along the first conveyance path P1. The first conveyance path P1 may be an example of a conveyance path. A width direction of the conveyance guide portion 10, e.g., the left-right direction, may be an example of a width direction. In the example embodiment, one end and an opposite end in the width direction may be examples of a right end and a left end, respectively.

A portion of the conveyance guide portion 10 may slantingly extend frontward and downward from the first introduction opening 11. Another portion of the conveyance guide portion 10 may extend horizontally forward from a central portion of the housing 30 in the front-rear direction, e.g., the junction J1, to the discharge opening 13.

As depicted in FIG. 7, the first chute member 31 may be pivotally attached to the housing 30 about a rotation axis X31. The rotation axis X31 may extend in the left-right direction at the lower end 31BA of the front surface 31B of the first chute member 31. As the first chute member 31 pivotally moves to separate from the second chute member 32 in an upward direction, the conveyance guide portion 10 may open.

As depicted in FIG. 4, a portion of the conveyance guide portion 10 on the right side and on the side of the discharge opening 13 with respect to the junction J1 may be herein defined as a card conveyance area 29. The card conveyance area 29 may be an example of a conveyance area.

Figure 2:
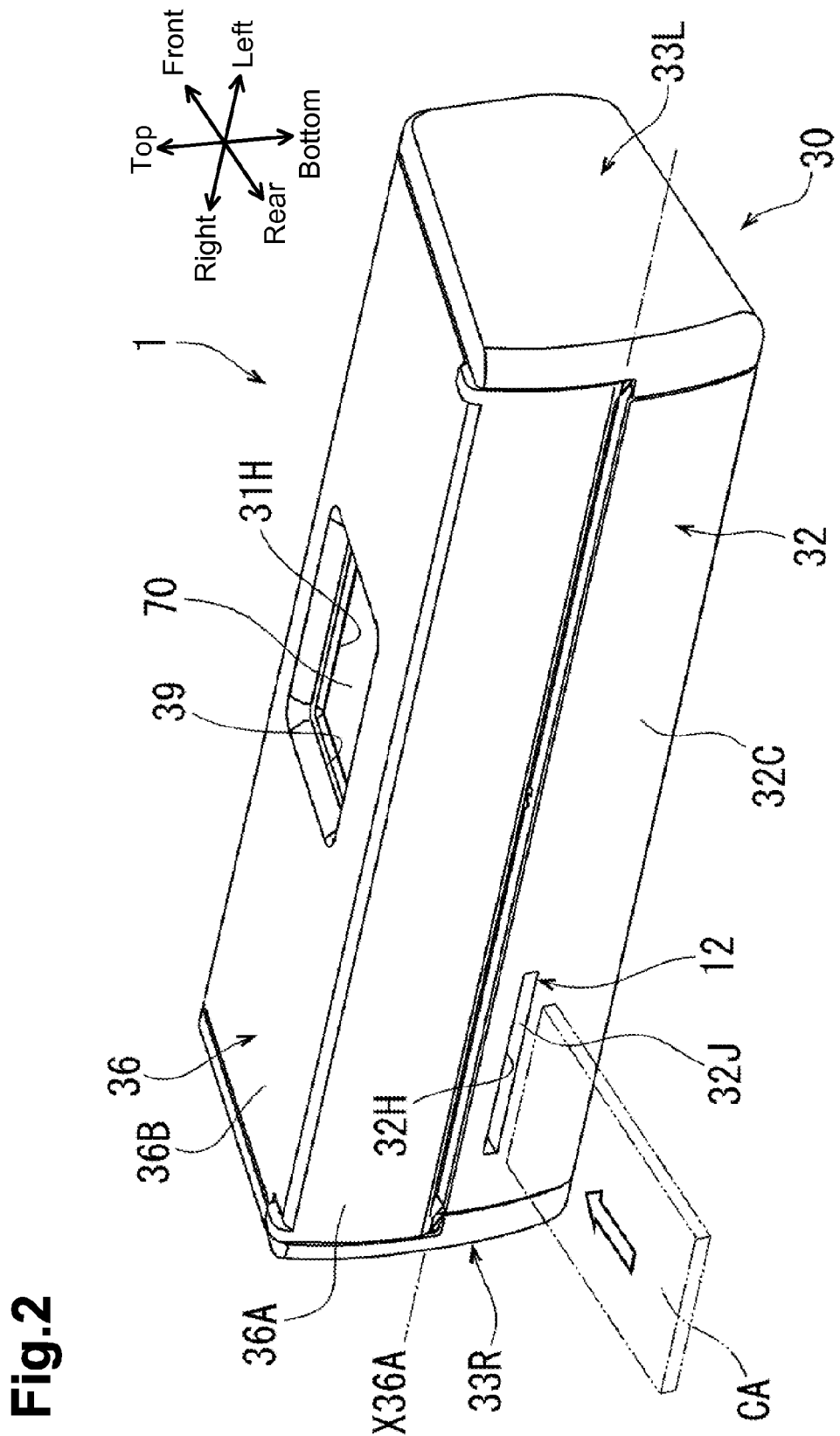
FIG. 2 is a rear perspective view of the image reading apparatus in which the sheet tray is closed.

As depicted in FIGS. 2 and 6, the housing 30 may have a second introduction opening 12. A card CA having a width smaller than that of the sheet SH may be inserted into the second introduction opening 12. The card CA may be a sheet having an area smaller than that of the sheet SH. The card CA may be, for example, a business card, an ATM card, a membership card, a license card. The length of the shorter side, e.g., width, and length of the longer side of the card CA may be, for example, 53.98 mm and 85.60 mm, respectively, of an ID-1 format card whose size is specified by the International Organization for Standardization (ISO)/International Electrotechnical Commission (IEC). The card CA may be thicker and more rigid than the sheet SH. The card CA may be an example of a second medium.

More specifically, the second introduction opening 12 may be provided in the second chute member 32, as depicted in FIG. 6. The second introduction opening 12 may be disposed at a portion of the rear surface 32C on the side of the right side frame 33R. The second introduction opening 12 may extend in the left-right direction. The length of the second introduction opening 12 in the left-right direction may be less than the length of the first introduction opening 11 in the left-right direction. The length of the second introduction opening 12 in the left-right direction may be greater than the width of the card CA, e.g., 85.60 mm. The height of the second introduction opening 12 in the vertical direction may be almost the same as the height of the horizontal portion of the conveyance guide portion 10 and the discharge opening 13 in the vertical direction. The second introduction opening 12 may be disposed below a right end portion of the first introduction opening 11 in the vertical direction.

Figure 3:
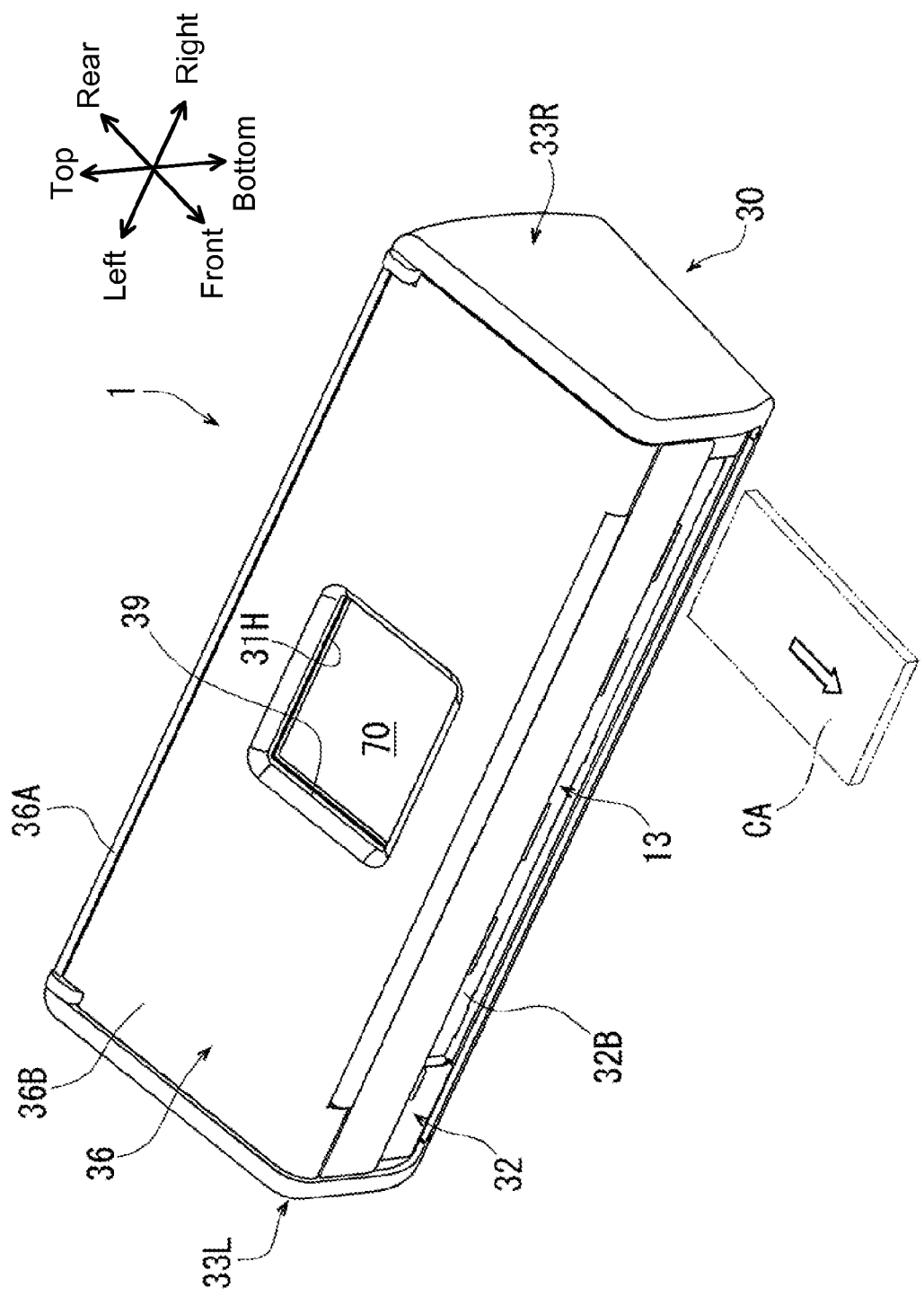
FIG. 3 is a front perspective view of the image reading apparatus in which the sheet tray is closed.

As depicted in FIGS. 3 and 6, the card CA may be discharged from a right end portion of the discharge opening 13. In other words, the discharge opening 13 may be shared to discharge the sheet SH inserted from the first introduction opening 11 and the card CA inserted from the second introduction opening 12.

As depicted in FIGS. 4, 6 and 8, the image reading apparatus 1 may comprise a second conveyance guide portion 20. The second conveyance guide portion 20 may comprise a second conveyance path P2 that may be defined between the upper card guide surface 32H of the second chute member 32 and the lower card guide surface 32J in vertical direction, as depicted in FIG. 6. The second conveyance guide portion 20 may join the conveyance guide portion 10 at the junction J1. The second conveyance guide portion 20 may be configured to guide the card CA inserted from the second introduction opening 12 along the second conveyance path P2, to the conveyance guide portion 10.

The junction J1 may be disposed between the inclined portion and the horizontal portion of the upper guide surface 31G. The second conveyance guide portion 20 may join the conveyance guide portion 10 at the junction J1. Thus, the second conveyance guide portion 20 and a right side portion of the conveyance guide portion 10 where the card conveyance area 29 may be disposed, may define a path extending horizontally from the second introduction opening 12 disposed on the rear side of the image reading apparatus 1 to the right end portion of the discharge opening 13 disposed on the front side of the image reading apparatus 1. The card CA may be guided from the second introduction opening 12 to the right side portion of the discharge opening 13 along the path.

As depicted in FIG. 1, the sheet tray 36 may comprise a base portion 36A, a central portion 36B and a tip portion 36C. The base portion 36A may be pivotally supported by the side frames 33L and 33R about a rotation axis X36A extending along the left-right direction. The central portion 36B may be connected to an end of the base portion 36A further from the rotation axis X36A. The tip portion 36C may be connected to an end of the central portion 36B further from the base portion 36A. The central portion 36B may have an opening 39 of a rectangular shape at a central portion thereof.

When the sheet tray 36 is open as depicted in FIGS. 1 and 5, the base portion 36A, the central portion 36B and the tip portion 36C may extend upward and rearward so as to continue to the inclined portion of the lower guide surface 32G. When the sheet tray 36 is open, the first introduction opening 11 may open. One or more sheets SH may be placed on the sheet tray 36. The sheet tray 36 may comprise a pair of left and right width regulation guides 36W. The width regulation guides 36W may be configured to interpose one or more sheets SH placed on the sheet tray 36 therebetween in the left-right direction, to position the sheets SH on the sheet tray 36 with respect to the left-right direction. The sheets SH placed on the sheet tray 36 may be inserted into the first introduction opening 11 and be guided to the discharge opening 13 by the conveyance guide portion 10.

When the sheet tray 36 is closed as depicted in FIGS. 2, 3 and 6, the base portion 36A may extend vertically and be flush with the rear surface 32C of the second chute member 32. The central portion 36B may cover the upper surface 31A of the first chute member 31 from above. The tip portion 36C may cover the front surface 31B of the first chute member 31 from the front side of the front surface 31B. As depicted in FIGS. 2 and 3, the opening 39 may allow the touch panel 70 to be exposed outside the image reading apparatus 1 when the sheet tray 36 is closed.

As depicted in FIGS. 4-6, the image reading apparatus 1 may comprise a control board 54, a drive source 40M, a conveyor 40 and a reader 55.

As depicted in FIGS. 5 and 6, the control board 54 may be disposed at a bottom portion of the second chute member 32. The control board 54 may be a flat-shaped electronic circuit board comprising a central processing unit (CPU), a read-only memory (ROM), and a random-access memory ("RAM"). Power may be supplied to the control board 54 from a home electric outlet, via an AC adapter and a power supply cord. The control board 54 may be electrically connected to, for example, the drive source 40M, the reader 55, and the touch panel 70. The control board 54 may be configured to control the drive source 40M, the reader 55, and the touch panel 70 by supplying power to the drive source 40M, the reader 55, and the touch panel 70 when necessary.

As depicted in FIG. 4, the drive source 40M may be disposed in the housing 30 at the left side frame 33L. The drive source 40M may comprise a motor and transmission gears. The drive source 40M may be configured to generate the drive force while the motor is controlled by the control board 54.

As depicted in FIGS. 4-8, the conveyor 40 may comprise a separation roller 48, a drive shaft 48S, a separation pad 49, an upstream-side conveyor portion 41, and a downstream-side conveyor portion 42. The reader 55 may comprise a first reader 55A and a second reader 55B. In the conveyance guide portion 10, the separation roller 48 and the separation pad 49 may be followed by the upstream-side conveyor portion 41, the second reader 55B, the first reader 55A, and the downstream-side conveyor portion 42 that may be arranged in this order from the upstream side to the downstream side in a conveyance direction. The sheet SH and the card CA may be conveyed in the conveyance direction from the first introduction opening 11 and the second introduction opening 12, respectively, toward the discharge opening 13. The sheet SH and the card CA may be conveyed in the same direction on the side of the discharge opening 13 with respect to the junction J1. The separation roller 48 and the separation pad 49 may be disposed on the side of the first introduction opening 11 with respect to the junction J1. The upstream-side conveyor portion 41, the second reader 55B, the first reader 55A and the downstream-side conveyor portion 42 may be disposed on the side of the discharge opening 13 with respect to the junction J1.

As depicted in FIGS. 5 and 8, the separation roller 48 may be rotatably supported in the second chute member 32. An upper portion of the separation roller 48 may be exposed from the inclined portion of the lower guide surface 32G toward the conveyance guide portion 10.

As depicted in FIGS. 4 and 8, the separation roller 48 may be disposed at a central portion of the conveyance guide portion 10 in the left-right direction. The central portion of the conveyance guide portion 10 in the left-right direction may comprise at least an area of the conveyance guide portion 10 on a left side of the card conveyance area 29. The separation roller 48 may be connected to the drive source 40M by the drive shaft 48S. The drive shaft 48S may be coaxial with the separation roller 48 and extend in the left-right direction. The right end of the drive shaft 48S may slightly protrude rightward from a right end surface 48R of the separation roller 48. The drive shaft 48S may be rotatably supported by the second chute member 32. The right end of the drive shaft 48S may stop or be positioned at the left of the card conveyance area 29, e.g., on the left side with respect to the card conveyance area 29. The drive shaft 48S may be configured to transmit the drive force from the drive source 40M to the separation roller 48.

The separation roller 48 may be configured to be driven by the drive source 40M, via the drive shaft 48S. The control board 54 may be configured to control the drive source 40M. As depicted in FIG. 5, the separation roller 48 may be configured to rotate while making contact with the sheets SH placed on the sheet tray 36 to feed the sheets SH to the conveyance guide portion 10.

As depicted in FIG. 7, the separation pad 49 may be disposed at the first chute member 31. As depicted in FIG. 5, the separation pad 49 may be exposed to the conveyance guide portion 10 in the upper guide surface 31G. The separation pad 49 may comprise a friction member, e.g., rubber and elastomer, having a plate shape. The separation pad 49 may be urged by an urging member (not depicted) so that the separation pad 49 may be pressed against the separation roller 48 when the first chute member 31 is closed. The separation roller 48 and the separation pad 49 may be configured to separate the sheets SH to be conveyed in the conveyance guide portion 10 one by one while holding the sheets SH therebetween.

As depicted in FIGS. 4-8, the upstream-side conveyor portion 41 may comprise first conveyance roller pairs 41A and 41B and a second conveyance roller pair 41D. The first conveyance roller pairs 41A and 41B and the second conveyance roller pair 41D may be disposed in the horizontal portions of the upper guide surface 31G and the lower guide surface 32G at the same positions in the conveyance direction. Each of the first conveyance roller pairs 41A and 41B and the second conveyance roller pair 41D may comprise a drive roller configured to be rotated by the drive source 40M and a driven roller facing the drive roller in the vertical direction when the first chute member 31 is closed. The second conveyance roller pair 41D may comprise a first roller 110 configured to rotate while being driven by the drive source 40M, and a second roller 120 and a third roller 130 that may oppose the first roller 110 in the vertical direction.

The first conveyance roller pairs 41A and 41B may be disposed outside the card conveyance area 29 in the left-right direction. The first conveyance roller pairs 41A and 41B may be configured to rotate while holding or nipping the sheet SH to convey the sheet SH in the conveyance guide portion 10. The second conveyance roller pair 41D may be disposed at the card conveyance area 29. The second conveyance roller pair 41D may be configured to rotate while holding or nipping the card CA, to convey the card CA to the card conveyance area 29 in the conveyance guide portion 10. As depicted in FIGS. 4 and 6, the second conveyance roller pair 41D may be disposed in front of the junction J1. In other words, the junction J1 may be disposed between the separation roller 48 and the second conveyance roller pair 41D in the front-rear direction.

The second reader 55B may be attached to the second chute member 32. More specifically, the second reader 55B may comprise a contact image sensor ("CIS"), a CIS holder and a contact glass. The upper surface of the second reader 55B may be exposed to the conveyance guide portion 10 at the horizontal portion of the lower guide surface 32G.

The first reader 55A may be attached to the first chute member 31. More specifically, the first reader 55A may comprise a contact image sensor ("CIS"), a CIS holder and a contact glass. The lower surface of the first reader 55A may be exposed to the conveyance guide portion 10 at the horizontal portion of the upper guide surface 31G.

The first reader 55A may be disposed closer to the discharge opening 13 than the second reader 55B. The first reader 55A and the second reader 55B may be disposed across the entire length of the conveyance guide portion 10 comprising the card conveyance area 29 in the left-right direction. The first reader 55A and the second reader 55B may be disposed opposite to each other in the vertical direction to interpose the conveyance guide portion 10.

With the above-described structure, the first reader 55A and the second reader 55B may be configured to read an image on each side of the sheet SH when the sheet SH is conveyed in the conveyance guide portion 10. The first reader 55A and the second reader 55B may also be configured to read an image on each side of the card CA when the card CA guided by the second conveyance guide portion 20 is conveyed in the card conveyance area 29.

The downstream-side conveyor portion 42 may comprise first conveyance roller pairs 42A, 42B, and 42C and a second conveyance roller pair 42D. The first conveyance roller pairs 42A, 42B, and 42C and the second conveyance roller pair 42D may be disposed in the horizontal portions of the upper guide surface 31G and the lower guide surface 32G at the same position in the conveyance direction. Each of the first conveyance roller pairs 42A, 42B, and 42C and the second conveyance roller pair 42D may comprise a drive roller configured to be rotated by the drive source 40M and a driven roller facing the drive roller in the vertical direction when the first chute member 31 is closed.

The first conveyance roller pairs 42A, 42B, and 42C may be disposed outside the card conveyance area 29 in the left-right direction. The first conveyance roller pairs 42A, 42B, and 42C may be configured to rotate while holding or nipping the sheet SH being conveyed in the conveyance guide portion 10, to discharge the sheet SH outside the housing 30 through the discharge opening 13. The second conveyance roller pair 42D may be disposed to the card conveyance area 29. The second conveyance roller pair 42D may be configured to rotate while holding or nipping the card CA whose image has been read in the card conveyance area 29, to discharge the card CA outside the housing 30 through the right portion of the discharge opening 13.

As depicted in FIGS. 1 and 5, the touch panel 70 may be attached to an interior of the first chute member 31 on the side of the upper surface 31A. The touch panel 70 may be exposed outside the first chute member 31 through a rectangular-shaped touch panel opening 31H that may be provided in the upper surface 31A. The touch panel 70 may comprise a liquid crystal display panel, a light source, e.g., fluorescent lamp or a light-emitting diode (LED), configured to irradiate the liquid crystal display panel with light from the back side of the liquid crystal display panel, and a contact sensing film attached to a surface of the liquid crystal display panel.

The touch panel 70 may be configured to display an operational status of the image reading apparatus 1, e.g., a processing status of an image reading operation and errors, and various buttons, e.g., buttons to start an image reading operation and to make settings, under the control of the control board 54. The touch panel 70 may be configured to permit an external input. When a button displayed in the touch panel 70 is touched to perform an operation or setting corresponding to the button, the touch panel 70 may transmit a signal in response to the touch operation, to the control board 54.

The image reading apparatus 1 may be configured to read an image on the sheet SH and the card CA.

When an image on the sheet SH is read, the sheet tray 36 may be open, as depicted in FIGS. 1 and 5. One or more sheets SH may be placed on the sheet tray 36. When the control board 54 receives an instruction to read an image on the sheet SH from the touch panel 70, the control board 54 may start the operation of reading an image on the sheet SH after a sheet detection sensor (not depicted) detects that one or more sheets SH are placed on the sheet tray 36.

The control board 54 may send an instruction to generate the drive force to the drive source 40M. In response to the instruction, the separation roller 48 may be first rotated while holding the sheet SH together with the separation pad 49. The separation roller 48 may introduce the sheet SH placed on the sheet tray 36 through the first introduction opening 11 and fed the sheet SH to the conveyance guide portion 10. At this time, the sheets SH may be separated one by one due to frictional force between the separation pad 49 and the sheet SH if the sheets SH are conveyed at one time.

Thereafter, the first conveyance roller pairs 41A and 41B of the upstream-side conveyor portion 41 may convey the sheet SH fed by the separation roller 48 along the conveyance guide portion 10. The first reader 55A and the second reader 55B may read an image on each side of the sheet SH being conveyed along the conveyance guide portion 10. The first conveyance roller pairs 42A, 42B, and 42C of the downstream-side conveyor portion 42 may discharge the sheet SH whose image has been read, outside the housing 30 through the discharge opening 13.

When an image on the card CA is read, the sheet tray 36 may be closed, as depicted in FIGS. 2, 3 and 6. When the sheet tray 36 is closed, the card CA may be inserted into the second introduction opening 12 from the rear side of the housing 30, as depicted in FIG. 2. Thereafter, the card CA may pass through the second conveyance guide portion 20. The leading end of the card CA may reach the card conveyance area 29. When the control board 54 receives an instruction to read an image on the card CA from the touch panel 70, the control board 54 may start the operation of reading an image on the card CA after a card detection sensor (not depicted) detects that the card CA is inserted from the second introduction opening 12.

The control board 54 may send an instruction to generate the drive force to the drive source 40M. The second conveyance roller pair 41D of the upstream-side conveyor portion 41 may convey the card CA in the card conveyance area 29. The first reader 55A and the second reader 55B may read an image on each side of the card CA being conveyed in the card conveyance area 29. As depicted in FIG. 3, the second conveyance roller pair 42D of the downstream-side conveyor portion 42 may discharge the card CA whose image has been read, outside the housing 30 through the discharge opening 13.

The second conveyance roller pair 41D depicted in FIGS. 4, 6, 7 and 9 may be configured to convey the card CA in the card conveyance area 29 by the first roller 110, the second roller 120 and the third roller 130 in cooperation with each other.

As depicted in FIG. 6, the first roller 110 may be rotatably supported in the second chute member 32. An upper portion of the first roller 110 may be exposed to the conveyance guide portion 10 from the horizontal portion of the lower guide surface 32G near the junction J1.

As depicted in FIG. 4, the first roller 110 may be connected to the drive source 40M, via a drive shaft 41S. The drive shaft 41S may extend in the left-right direction. The drive shaft 41S may be disposed coaxially with the drive roller of each first conveyance roller pair 41A and 41B, and the first roller 110. The drive shaft 41S may be configured to transmit the drive force from the drive source 40M to the drive roller of each first conveyance roller pair 41A and 41B, and the first roller 110.

Figure 9:
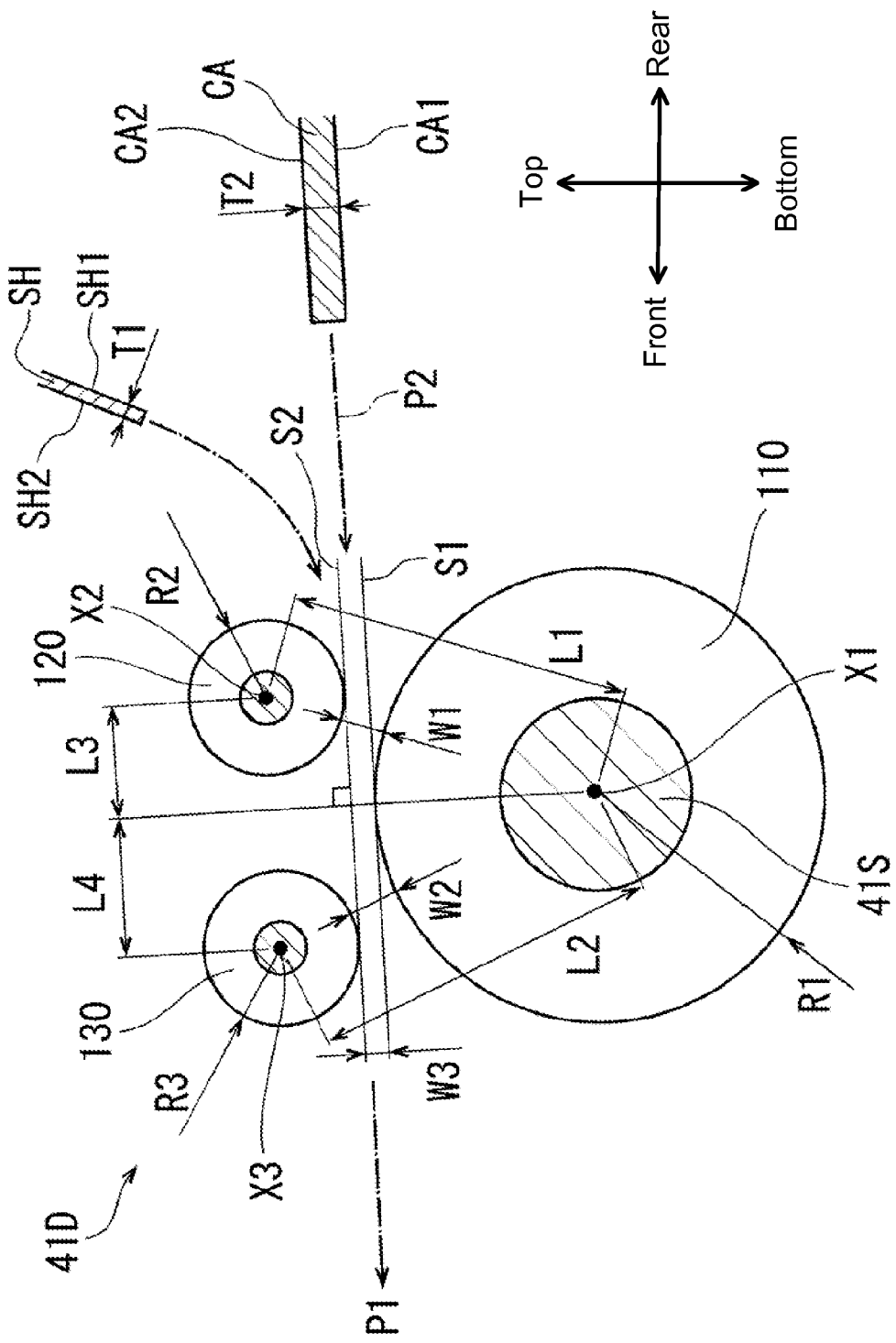
FIG. 9 is a sectional view of a first roller, a second roller and a third roller of the image reading apparatus showing a positional relation of the first roller, the second roller and the third roller.

As depicted in FIGS. 4, 6 and 9, the control board 54 may be configured to control the drive source 40M to rotate the first roller 110 on a first axis X1 extending parallel to the left-right direction.

Figure 10:
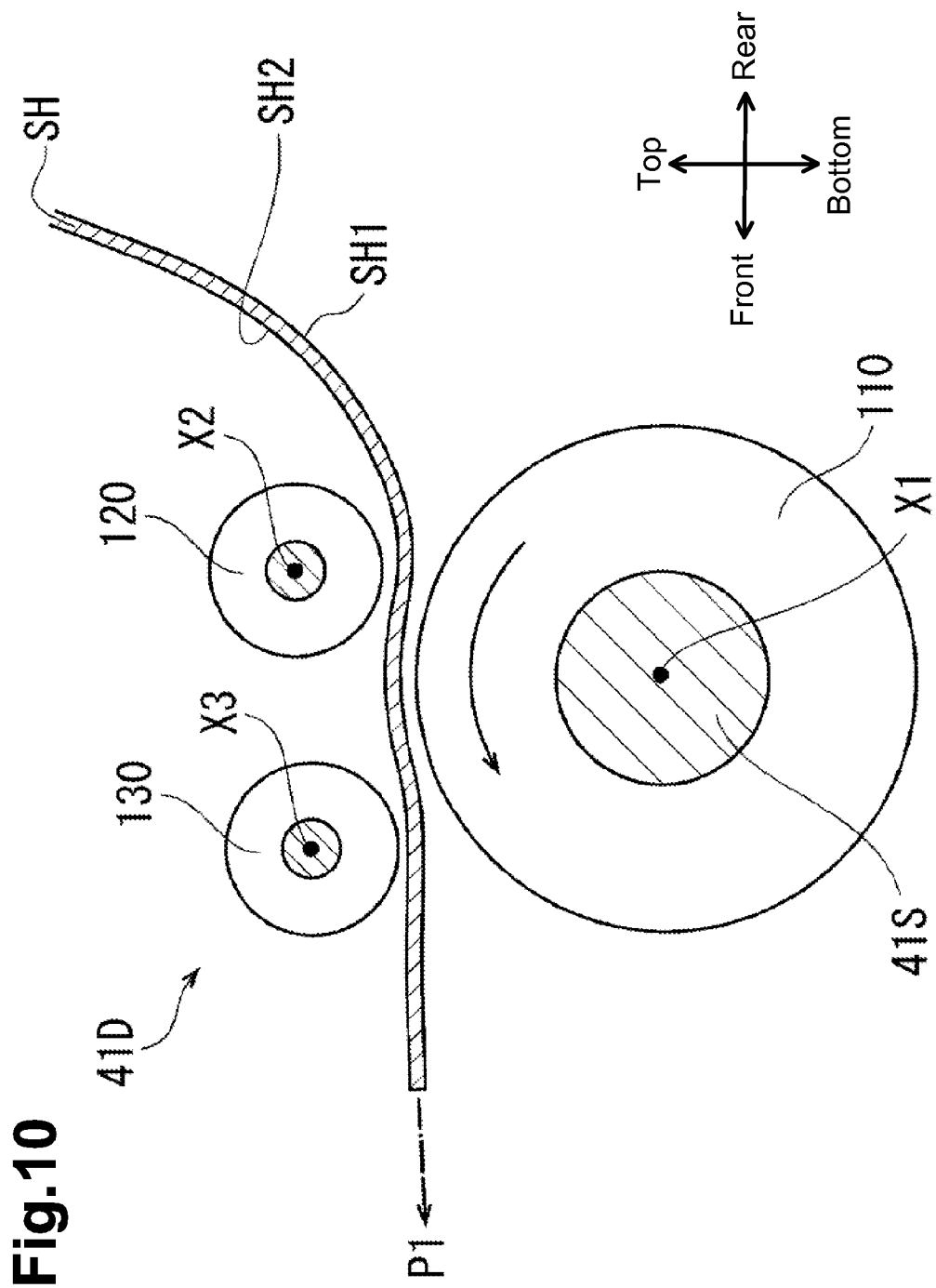
FIG. 10 is a sectional view of the first roller, the second roller and the third roller showing a first medium passing between the first roller, and the second and third rollers.
Figure 11:
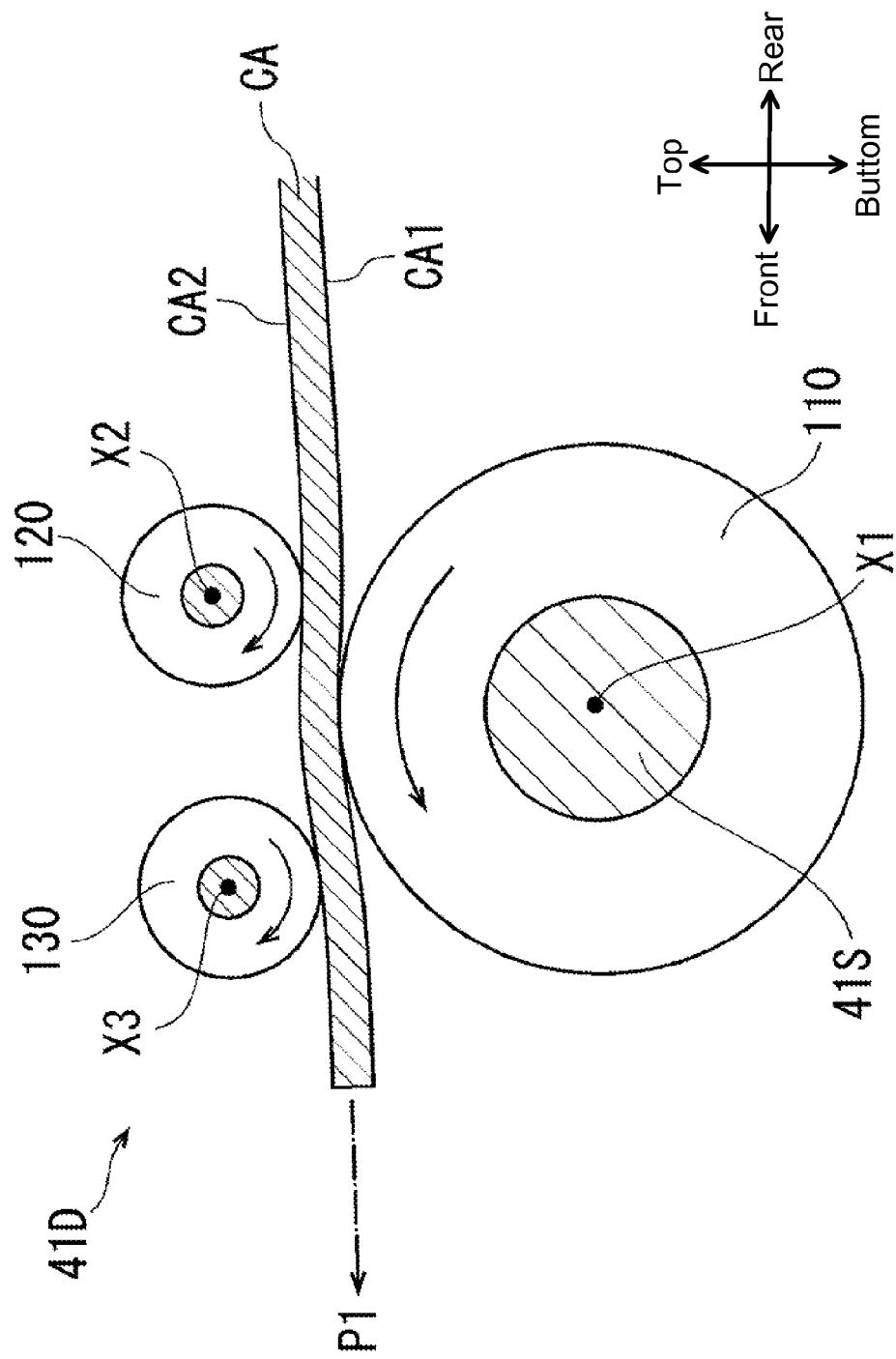
FIG. 11 is a sectional view of the first roller, the second roller and the third roller showing a second medium passing between the first roller, and the second and third rollers.

As depicted in FIG. 10, the first roller 110 may be configured to contact a lower surface SH1 of the sheet SH. As depicted in FIG. 11, the first roller 110 may be configured to contact a lower surface CA1 of the card CA. The lower surface CA1 may be an example of a first surface.

As depicted in FIGS. 6, 7 and 9, the second roller 120 may be supported in the first chute member 31 so as to rotate on a second axis X2 extending parallel to the left-right direction. The third roller 130 may be supported in the first chute member 31 so as to rotate on a third axis X3 extending parallel to the left-right direction. The second roller 120 and the third roller 130 may be exposed to the conveyance guide portion 10 from the horizontal portion of the upper guide surface 31G near the junction J1.

As depicted in FIG. 6, the second roller 120 may be positioned on the upstream side of the first axis X1 in the conveyance direction of the card CA that may be conveyed in the card conveyance area 29 from the junction J1 toward the discharge opening 13, e.g., on the side of the junction J1. The third roller 130 may be disposed on the downstream side of the first axis X1 in the conveying direction of the card CA, e.g., on the side of the discharge opening 13.

In other words, the second roller 120 may be rotatably disposed on the second axis X2 that may be parallel to the first axis X1 and opposite to the first axis X1 with respect to the first conveyance path P1. The third roller 130 may be rotatably disposed on the third axis X3 that may be parallel to the first axis X1 and opposite to the first axis X1 with respect to the first conveyance path P1. The third roller 130 may be an example of a contact portion.

As depicted in FIG. 10, the second roller 120 and the third roller 130 may be configured to contact an upper surface SH2 of the sheet SH. As depicted in FIG. 11, the second roller 120 and the third roller 130 may be configured to contact an upper surface CA2 of the card CA. The upper surface CA2 may be an example of a second surface.

As depicted in FIG. 9, the second axis X2 may be separated from the first axis X1 by a certain distance, e.g., a distance L1, greater than the sum of a radius R1 of the first roller 110 and a radius R2 of the second roller 120. When the rollers 110, 120 and 130 are viewed along the first axis X1, e.g., the left-right direction, for example, as in FIG. 9, a certain distance, e.g., a first distance W1, may be ensured between the first roller 110 and the second roller 120. The second roller 120 may be fixed to the first chute member 31 while keeping the distance W1 from the first roller 110.

The third axis X3 may be separated from the first axis X1 by a certain distance, e.g., a distance L2, greater than the sum of the radius R1 of the first roller 110 and a radius R3 of the third roller 130. When the rollers 110, 120 and 130 are viewed along the first axis X1, for example, as in FIG. 9, a certain distance, e.g., a second distance W2, may be ensured between the first roller 110 and the third roller 130. The third roller 130 may be fixed to the first chute member 31 while keeping the distance W2 from the first roller 110.

The first distance W1 and the second distance W2 may be set greater than a thickness T1 of the sheet SH. As depicted in FIG. 11, the first distance W1 and the second distance W2 may be set such that the first roller 110 may contact the lower surface CA1, and the second roller 120 and the third roller 130 may contact the upper surface CA2 when the card CA is conveyed along the conveyance guide portion 10. More specifically, as depicted in FIG. 9, when the rollers 110, 120 and 130 are viewed along the first axis X1, a tangent line that may contact the second roller 120 and the third roller 130 may be defined as a second tangent line S2. A tangent line that may contact the first roller 110 and extend parallel to the second tangent line S2 may be defined as a first tangent line S1. The first distance W1 and the second distance W2 may be set such that a third distance W3 between the second tangent line S2 and the first tangent line S1 may become less than a thickness T2 of the card CA.

In the image reading apparatus 1 according to the first example embodiment, the first distance W1 and the second distance W2 may be set greater than the thickness T1 of the sheet SH, as depicted in FIG. 9. With such settings of the first distance W1 and the second distance W2, when the sheet SH conveyed along the conveyance guide portion 10 passes between the first roller 110 and the second roller 120, as depicted in FIG. 10, the sheet SH may contact the first roller 110 or the second roller 120 but might not be nipped between the first roller 110 and the second roller 120. When the sheet SH passes between the first roller 110 and the third roller 130, the sheet SH may contact the first roller 110 or the third roller 130 but might not be nipped between the first roller 110 and the third roller 130. Therefore, when the sheet SH is conveyed by the separation roller 48 and the first conveyance roller pairs 41A and 41B in the image reading apparatus 1, application of conveyance force from the first roller 110 configured to rotate, to a right end portion of the sheet SH conveyed along the conveyance guide portion 10 may be reduced. Variances in the conveyance force with respect to the left-right direction of the sheet SH may be prevented or reduced. Consequently, in the image reading apparatus 1, skew of the sheet SH may be prevented or reduced.

In the image reading apparatus 1, the second roller 120 may be positioned upstream of the first axis X1 of the first roller 110 in the conveyance direction of the card CA, e.g., a side of junction J1, as depicted in FIG. 9. The third roller 130 may be positioned downstream of the first axis X1 in the conveyance direction of the card CA, e.g., a side of discharge opening 13. When the rollers 110, 120 and 130 are viewed along the first axis X1, the first distance W1 and the second distance W2 may be set such that the third distance W3 between the second tangent line S2 and the first tangent line S1 may become less than the thickness T2 of the card CA. Thus, the second roller 120 and the third roller 130 may contact the upper surface CA2 of the card CA while the first roller 110 contacts the lower surface CA1 of the card CA when the card CA is conveyed along the conveyance guide portion 10, as depicted in FIG. 11. The card CA may be thicker and more rigid than the sheet SH. Therefore, as the card CA flexes by contacting the first roller 110, the second roller 120 and the third roller 130 at the same time, the card CA may store restoring force that may bring the card CA back to its original flat state. With the restoring force, pressing force of the first roller 110, the second roller 120 and the third roller 130 may favorably act on the card CA. Therefore, the first roller 110 that may be rotated by the drive source 40M may favorably apply the conveyance force to the card CA. Consequently, the card CA may be favorably conveyed in the image reading apparatus 1.

Further, in the image reading apparatus 1, the distance L1 between the first axis X1 of the first roller 110 and the second axis X2 of the second roller 120 may be constant, as depicted in FIG. 9. The distance L2 between the first axis X1 of the first roller 110 and the third axis X3 of the third roller 130 may be constant. The second roller 120 and the third roller 130 may be fixed to the first chute member 31 while keeping the distances W1 and W2, respectively, from the first roller 110. Therefore, in the image reading apparatus 1, unlike the known image reading apparatus, an urging spring configured to urge the second roller 120 and the third roller 130 toward the first roller 110, and a guide member configured to make the second roller 120 and the third roller 130 contact the card CA might not be required. Thus, reduction in the manufacturing costs of the image reading apparatus 1 may be realized.

Accordingly, the image reading apparatus 1 according to the first example embodiment, the card CA may be favorably conveyed while the skew of the sheet SH is prevented or reduced, and reduction in the manufacturing costs of the image reading apparatus 1 may be realized.

In the image reading apparatus 1, the contact portion, e.g., the third roller 130, may contact the upper surface CA2 of the card CA while rotating. The card CA may be smoothly conveyed.

Second Example Embodiment

Figure 12:
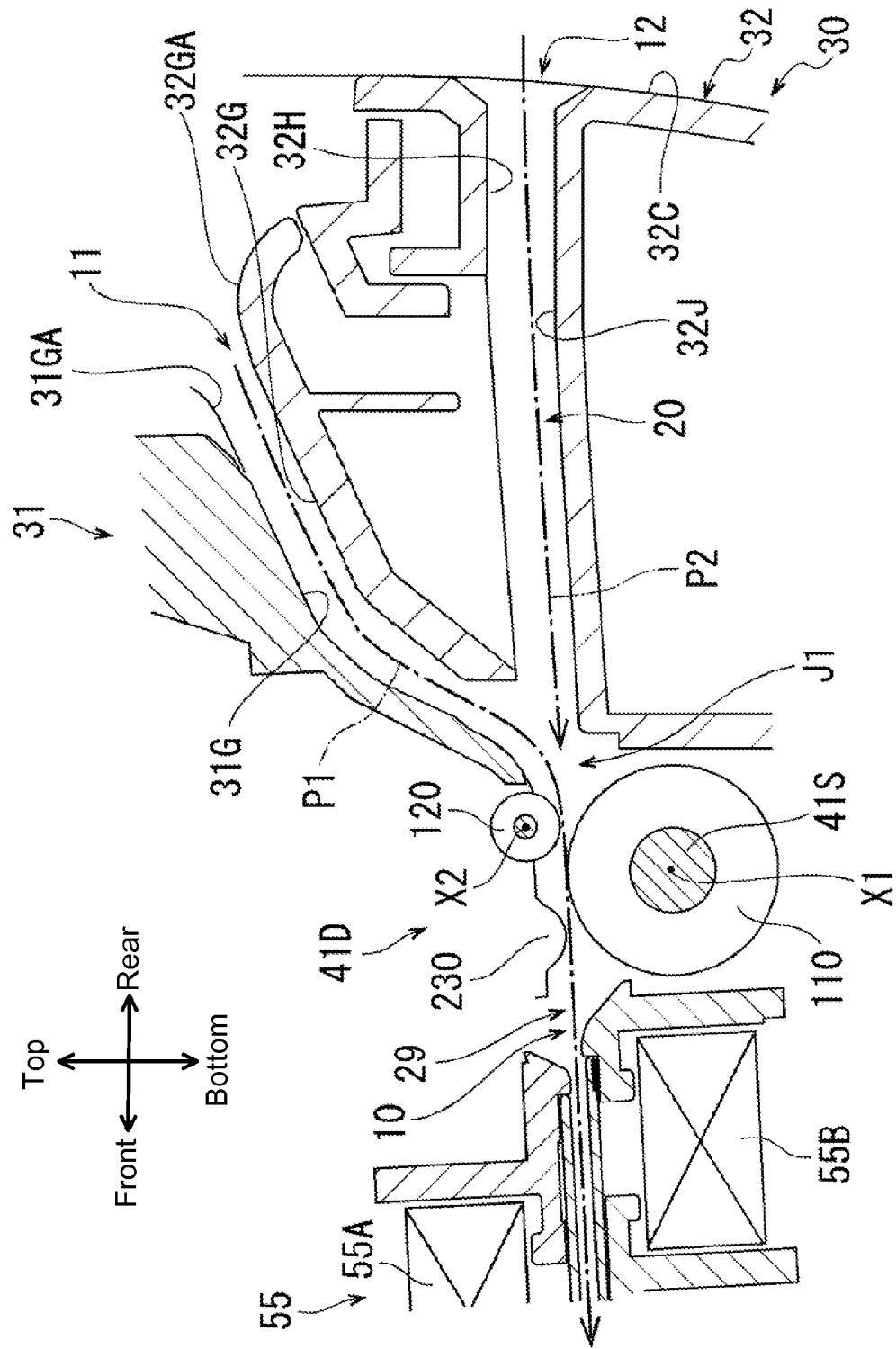
FIG. 12 is a partially sectional view of an image reading apparatus in a second example embodiment.

In an image reading apparatus according to the second example embodiment, a contact portion 230 may be employed, as depicted in FIG. 12, instead of the third roller 130 of the image reading apparatus 1 according to the first example embodiment. Other structures of the second example embodiment may be similar to those of the first example embodiment. Like reference numerals may be used for like corresponding components in FIG. 12 and a detailed description thereof with respect to the second example embodiment may be omitted herein.

The contact portion 230 may comprise a rib or protrusion that may be disposed at a position where the third roller 130 may be disposed in the first chute member 31. When viewed along the first axis X1, for example, as in FIG. 12, the contact portion 230 may have an outline of a downward-protruding arc shape. The outline of the contact portion 230 may generally correspond to the outline of the outer peripheral surface of a lower portion of the third roller 130 of the first example embodiment. The second tangent line S2 depicted in FIG. 9 may be tangent to the outline of the contact portion 230 at its lower end. In other words, the second distance W2 and the third distance W3 in the first example embodiment may be maintained in the second example embodiment even if the third roller 130 is replaced with the contact portion 230.

In the image reading apparatus according to the second example embodiment, the card CA may be favorably conveyed while skew of the sheet SH is prevented or reduced, and reduction in the manufacturing costs of the image reading apparatus according to the second example embodiment may be realized, similar to the image reading apparatus 1 according to the first example embodiment.

Third Example Embodiment

Figure 13:
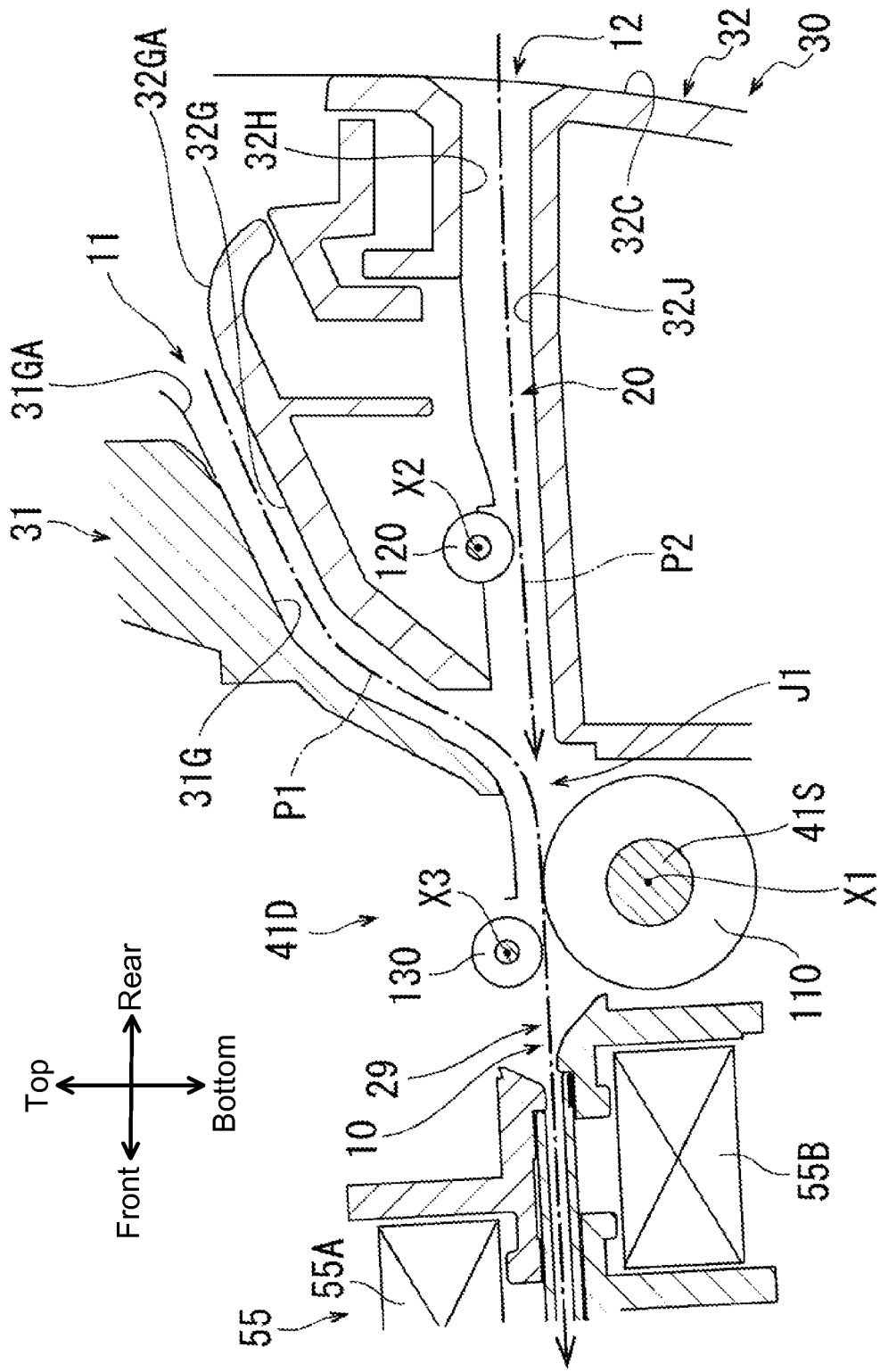
FIG. 13 is a partially sectional view of an image reading apparatus in a third example embodiment.

As depicted in FIG. 13, in an image reading apparatus according to the third example embodiment, the second roller 120 of the image reading apparatus 1 according to the first example embodiment may be moved on a side of the second introduction opening 12 with respect to the junction J1 while the second tangent line S2 depicted in FIG. 9 is tangent to the second roller 120. Other structures of the third example embodiment may be similar to those of the first example embodiment. Like reference numerals may be used for like corresponding components in FIG. 13 and a detailed description thereof with respect to the third example embodiment may be omitted herein.

In the third example embodiment, the second roller 120 may be rotatably supported in the upper card guide surface 32H of the second chute member 32. A first distance between the first roller 110 and the second roller 120 may be greater than the first distance W1 in the first example embodiment because the second roller 120 is moved. The second roller 120 may be moved while the second tangent line S2 depicted in FIG. 9 remains tangent to the second roller 120. Therefore, the third distance W3 in the first example embodiment may be maintained in the third example embodiment even if the second roller 120 is moved. When the sheet SH is conveyed by the separation roller 48 and the first conveyance roller pairs 41A and 41B in the image reading apparatus according to the third example embodiment, application of conveyance force from the first roller 110 configured to rotate, to a right end portion of the sheet SH conveyed along the conveyance guide portion 10 may further be reduced. Variances in the conveyance force with respect to the left-right direction of the sheet SH may further be prevented or reduced. Consequently, in the image reading apparatus according to the third example embodiment, skew of the sheet SH may further be prevented or reduced.

In the image reading apparatus according to the third example embodiment, the card CA may be favorably conveyed while the skew of the sheet SH is prevented or reduced, and reduction in the manufacturing costs of the image reading apparatus according to the third example embodiment may be realized, similar to the image reading apparatus 1 according to the first example embodiment and the image reading apparatus according to the second example embodiment.

Fourth Example Embodiment

A contact portion 430, as depicted in FIG. 14, may be employed in the image reading apparatus according to the fourth example embodiment, instead of the second roller 120, which may be moved, of the image reading apparatus according to the third example embodiment. Other structure of the fourth example embodiment may be similar to those of the third example embodiment. Like reference numerals may be used for like corresponding components in FIG. 14 and a detailed description thereof with respect to the fourth example embodiment may be omitted herein.

The contact portion 430 may comprise a rib or protrusion that may be disposed at a position where the second roller 120 of the third embodiment may be disposed in the second chute member 32. When viewed along the first axis X1, for example, as in FIG. 14, the contact portion 430 may have an outline of a downward-protruding arc shape. The outline of the contact portion 430 may generally correspond to the outline of the outer peripheral surface of a lower portion of the second roller 120 of the third example embodiment. A portion of the outline of the contact portion 430 on the side of the second introduction opening 12 may be gently inclined frontward and downward to reduce or prevent such a situation that the card CA may be caught by the contact portion 430. The second tangent line S2 depicted in FIG. 9 may be tangent to the outline of the contact portion 430 at its lower end. In other words, the third distance W3 in the first example embodiment may be maintained in the fourth example embodiment even if the second roller 120 in the third example embodiment is replaced with the contact portion 430.

In the image reading apparatus according to the fourth example embodiment, effects similar to those of the third example embodiment may be obtained.

While the disclosure has been described in detail with reference to the specific first to fourth example embodiments thereof, this is merely an example, and various changes, arrangements and modifications may be applied therein without departing from the spirit and scope of the disclosure.

For example, the disclosure may be applied to other apparatuses than the image reading apparatus, e.g., image forming apparatuses and multi-function apparatuses.

What is claimed is:
1. An image reading apparatus comprising:
   a housing configured to have an opened state and a closed state, the housing including:
      a first opening defined in a condition that the housing is in the opened state, the first opening configured to allow a first medium to be received;

a second opening configured to allow a second medium to be received, wherein in a direction perpendicular to a conveyance direction, a width of the second opening is less than a maximum width of the first opening;

a discharge opening configured to allow the first medium and the second medium to be discharged therethrough;

a first guide configured to guide the first medium from the first opening to the discharge opening;

a second guide configured to guide the second medium from the second opening to the discharge opening;

a first chute member; and a second chute member facing the first chute member, the second chute member comprising the second opening, the first chute member and the second chute member defining a conveyance path therebetween, wherein the first opening is disposed between the first chute member and the second chute member, and wherein the discharge opening is disposed between the first chute member and the second chute member, and on a downstream side of the first opening along the conveyance path;

a conveyor disposed along the conveyance path and configured to convey the first medium along the conveyance path, the conveyor comprising:

a first roller configured to rotate on a first axis for conveying the second medium along the conveyance path;

a second roller disposed along the conveyance path on a side opposite the first roller and configured to rotate on a second axis parallel to the first axis for conveying the second medium along the conveyance path, the second axis being separated from the first axis by a distance greater than a sum of radii of the first roller and the second roller; and a contact portion disposed along the conveyance path on the same side as the second roller and configured to contact the second medium along the conveyance path, wherein the contact portion comprises a rib or protrusion;

a reader disposed along the conveyance path and configured to read image data from the first medium and from the second medium;

wherein one of the second roller and the contact portion is disposed on an upstream side of the first axis along the conveyance path, and the other of the second roller and the contact portion is disposed on a downstream side of the first axis along the conveyance path, and wherein a first distance between a surface of the first roller and a surface of the second roller and a second distance between a surface of the first roller and a surface of the contact portion are fixed.

2. The image reading apparatus according to claim 1, wherein a distance between a first tangent line and a second tangent line is fixed, the second tangent line defined to contact the second roller and the contact portion, and the first tangent line defined to contact the first roller and be parallel to the second tangent line.

3. An image reading apparatus comprising:
a sheet tray including a guide configured to guide a first medium;
a first chute member;
a second chute member facing the first chute member, the second chute member comprising an opening configured to allow a second medium to be received, wherein in a direction perpendicular to a conveyance direction a width of the opening is less than a maximum width of the guide, wherein the second chute member and the first chute member define a first conveyance path therebetween, wherein the second chute member has a lower guide surface and an upper guide surface, wherein the lower guide surface and the upper guide surface define a second conveyance path therebetween;
a conveying roller configured to convey the first medium along the first conveyance path, and disposed on a downstream side of the sheet tray along the first conveyance path;
a first roller disposed along the first conveyance path and configured to rotate on a first axis for conveying the second medium along the first conveyance path;
a second roller disposed along the second conveyance path configured to rotate on a second axis parallel to the first axis for conveying the second medium along the second conveyance path, the second axis being separated from the first axis by a distance greater than a sum of radii of the first roller and the second roller;
a contact portion disposed along the second conveyance path on the same side as the second roller and configured to contact the second medium along the second conveyance path; and
a reader disposed along the first conveyance path and configured to read image data from the first medium and from the second medium,
wherein one of the second roller and the contact portion is disposed on an upstream side of the first axis along the second conveyance path, and the other of the second roller and the contact portion is disposed on a downstream side of the first axis along the second conveyance path, and
wherein a first distance between a surface of the first roller and a surface of the second roller and a second distance between a surface of the first roller and a surface of the contact portion are fixed.

4. The image reading apparatus according to claim 3, wherein a distance between a first tangent line and a second tangent line is fixed, the second tangent line defined to contact the second roller and the contact portion, and the first tangent line defined to contact the first roller and be parallel to the second tangent line.

5. The image reading apparatus according to claim 3,
wherein the contact portion is a third roller configured to rotate on a third axis extending parallel to the first axis; and
wherein the third axis is separated from the first axis by a distance greater than a sum of the radii of the first roller and the third roller.

6. The image reading apparatus according to claim 3, wherein the contact portion comprises a rib or protrusion.

* * * * *